United States Patent
Markey

(10) Patent No.: US 10,782,803 B2
(45) Date of Patent: Sep. 22, 2020

(54) ERGONOMIC BIKE GRIP CONTROLLER

(71) Applicant: Dillon Markey, Los Angeles, CA (US)

(72) Inventor: Dillon Markey, Los Angeles, CA (US)

( * ) Notice: Subject to any disclaimer, the term of this patent is extended or adjusted under 35 U.S.C. 154(b) by 217 days.

(21) Appl. No.: 15/899,321

(22) Filed: Feb. 19, 2018

(65) Prior Publication Data

US 2019/0258333 A1 Aug. 22, 2019

(51) Int. Cl.
| | |
|---|---|
| *G06F 3/0354* | (2013.01) |
| *B62K 23/02* | (2006.01) |
| *B62K 3/00* | (2006.01) |
| *B62K 21/26* | (2006.01) |
| *G06F 3/02* | (2006.01) |
| *H01H 13/00* | (2006.01) |

(52) U.S. Cl.
CPC ............ *G06F 3/03547* (2013.01); *B62K 3/00* (2013.01); *B62K 21/26* (2013.01); *B62K 23/02* (2013.01); *G06F 3/02* (2013.01); *H01H 13/00* (2013.01); *G06F 2203/0384* (2013.01)

(58) Field of Classification Search
CPC ........ G06F 3/011; G06F 3/03547; G06F 3/02; G06F 2203/0384; B62K 3/00; B62K 21/26; B62K 23/02; H01H 13/00

USPC .......................................................... 345/169
See application file for complete search history.

(56) References Cited

U.S. PATENT DOCUMENTS

| | | | |
|---|---|---|---|
| 2005/0126331 A1* | 6/2005 | Dal Pra ..................... | B62L 3/02 74/558.5 |
| 2008/0180233 A1* | 7/2008 | Miglioranza ........... | A45F 5/102 340/432 |
| 2015/0151672 A1* | 6/2015 | Hsu ...................... | B60Q 1/2615 701/45 |

FOREIGN PATENT DOCUMENTS

| | | |
|---|---|---|
| EP | 1502835 A1 | 2/2005 |
| RU | 2096196 C1 | 11/1997 |
| WO | 2014186609 A1 | 11/2014 |

* cited by examiner

*Primary Examiner* — Amare Mengistu
*Assistant Examiner* — Gloryvid Figueroa-Gibson
(74) *Attorney, Agent, or Firm* — Cohen IP Law Group, PC; Michael N. Cohen

(57) ABSTRACT

A control system configured with ergonomic hand grips is disclosed. The control system may be configured with the steering device of a vehicle and may include control buttons that may be programmed to control different aspects of electronic devices.

20 Claims, 5 Drawing Sheets

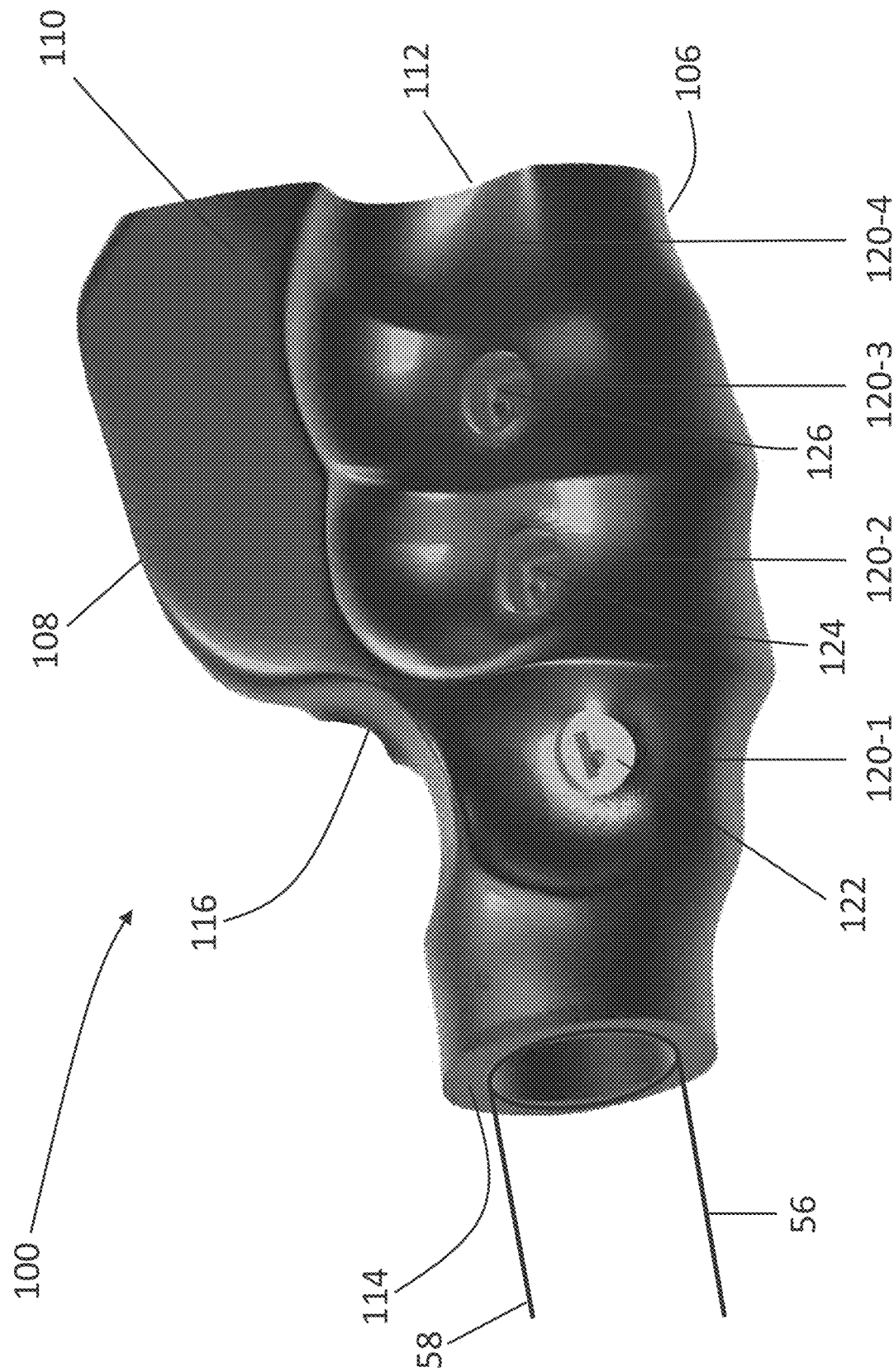

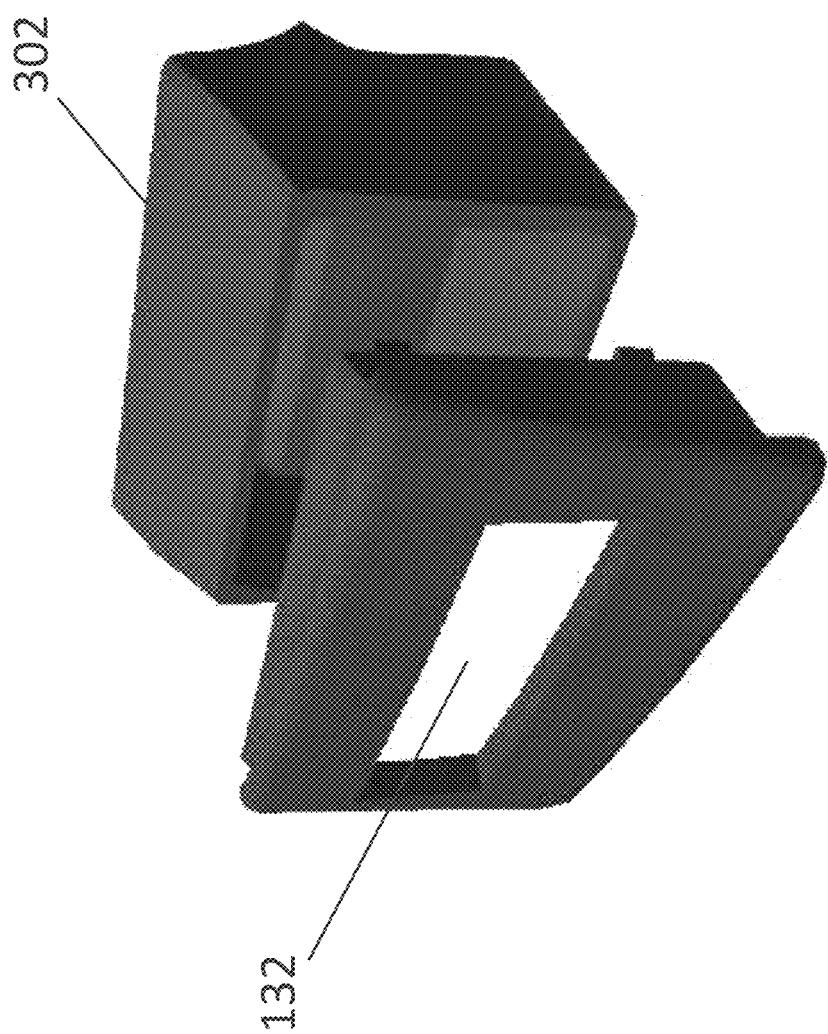

ERGONOMIC BIKE GRIP CONTROLLER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention generally relates a control system, and in particular, to a control system comprising ergonomic hand grips that provide control mechanisms.

BACKGROUND OF THE INVENTION

The use of mobile electronic devices such as smartphones and music players is ubiquitous. As such, the devices are used in all kinds of settings and environments.

However, it is a well-known fact that the use of such devices may be distracting and even dangerous while simultaneously performing other activities such as driving a car or riding a bike. In addition, it may be difficult to accurately interact with the mobile device (e.g. type on a touchscreen) while performing the other activities and as such, the mobile device may not be controlled properly.

Accordingly, there is a need for a system that may allow for a user of a mobile device to safely and precisely interact with the device while he/she may be performing other activities such as riding a bicycle.

It is desirable, and an object of this invention, to provide a control system that may allow for the safe, easy and precise control of a mobile electronic device while performing other activities simultaneously such as riding a bicycle.

It is also desirable and an object of this invention to provide a control system that may allow for the easy control of other devices that may be associated with a bicycle and the riding of such.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 2-4 depict aspects of a hand grip assembly;
and
FIG. 5 depicts aspects of an electrical housing.

DETAILED DESCRIPTION OF THE PREFERRED EMBODIMENTS

Figure 1:
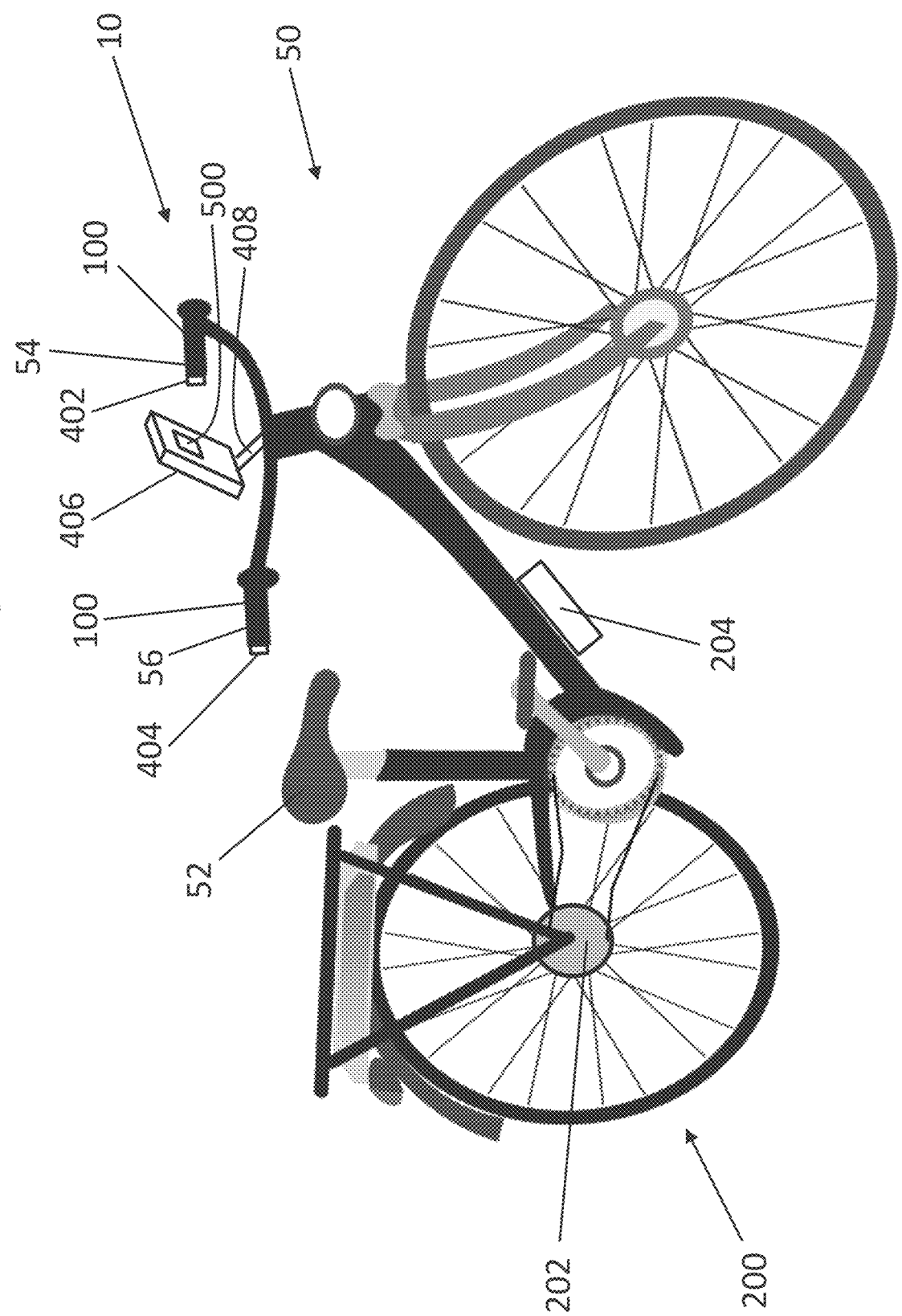
FIG. 1 depicts aspects of a control system.

As used herein, unless used otherwise, the following term has the following meaning:

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

The following detailed description is not intended to limit the current invention. Alternate embodiments and variations of the subject matter described herein will be apparent to those skilled in the art.

Control system 10 according to exemplary embodiments hereof is described with reference to FIGS. 1-5. Where the same or similar components appear in more than one figure, they are identified by the same or similar reference numerals.

In general, control system 10 may provide easy ergonomic control of a variety of devices. In this regard control system 10 may generally be a controller of components and devices. In particular, control system 10 may be integrated into an ergonomic hand grip. The hand grip may be used in a number of environments. For example, the system 10 may be configured with the steering device of a vehicle. In this example, the system 10 may be configured with the handlebars of a bicycle, a motorcycle or a scooter, or with the steering wheel of an automobile, an airplane, a helicopter, a boat or any other type of vehicle. In another example, the control system 10 may be configured with the handle or grip of other devices such as power tools or other types of devices that may include a handle or grip. It will be appreciated by a person of ordinary skill in the art upon reading this specification that the control system 10 may be configured with any type of device or structure that may benefit from control system 10, and that the scope of the control system 10 is not limited by the examples provided.

As shown in the figures, the control system 10 may generally include a hand grip assembly 100, a power assembly 200 and an electronics assembly 300. The control system 10 may also act as a controller to electronic devices 400 (alone and in combination). The control system 10 may also include a mobile app that may be used to configure, maintain, troubleshoot or generally operate and control system 10.

The hand grip assembly 100 may generally include one or more ergonomic hand grips that may include sensors, buttons and other input devices or mechanisms that may be controlled with the user's fingers (e.g. portions of the user's hand such as his/her fingertips, thumb tip, palm, fingers or other portions of his/her hand). The control system 10 may control a variety of devices and components including but not limited to: 1) mobile devices such as smart phones, tablet computers, music players and other types of mobile devices, 2) components, devices or functionalities of other devices such as turn signals on a bicycle, motorcycle or scooter, control settings on a power tool, or other types of setting on other types of products. Note that this list does not limit the scope of the control system 10 and that those of ordinary skill in the art will realize and appreciate, upon reading this description, that the control system 10 may control a wide variety of products, components and devices.

In one exemplary example, the control system 10 may be integrated into an ergonomic bicycle handlebar grip that may allow for the control of the bicycle's electronic turn signals. In another example, the handlebar grips of system 10 may provide for control of a mobile device that may be mounted on the bicycle. In this way, the user may control the turn signals and/or the mobile device without having to remove his/her hands from the handlebar grips such that the interaction with the turn signals and/or the mobile device is hands free and safe.

Hand Grip Assembly

The hand grip assembly 100 of control system 10 will now be described in detail with reference to FIGS. 1-5. As is known in the art, the user of the bicycle 50 depicted in FIG. 1 may generally sit on the seat 52 of the bicycle 50 with his/her arms extended forward and left and right hands engaged with the left end 54 and right end 56 of the handlebars 58 respectively. In this way, the user may steer or generally control the movement and direction of the bicycle through engagement with the handlebars 58. It may also be typical for the left and right ends 54, 56 of the handlebars 58 to each include a hand grip that the rider may hold instead of holding onto the bare metal end of the handlebars.

Control system 10 may include at least one of a left hand grip assembly 100 and a right hand grip assembly 100, and preferably may include both a left and a right hand grip assembly 100. The left and right hand grip assemblies 100 may be configured with the left and right outer ends 54, 56 of the handlebars 58 as shown. In this way, the rider of the bicycle may place their hands on the left and right hand grip assemblies 100 as they engage with the handlebars 58. Note that the left and right hand grip assemblies 100 depicted in FIG. 1 are meant to represent the general position of the hand grip assemblies 100 and do not necessarily reflect the shape and functionality of the hand grip assemblies 100.

Figure 2:
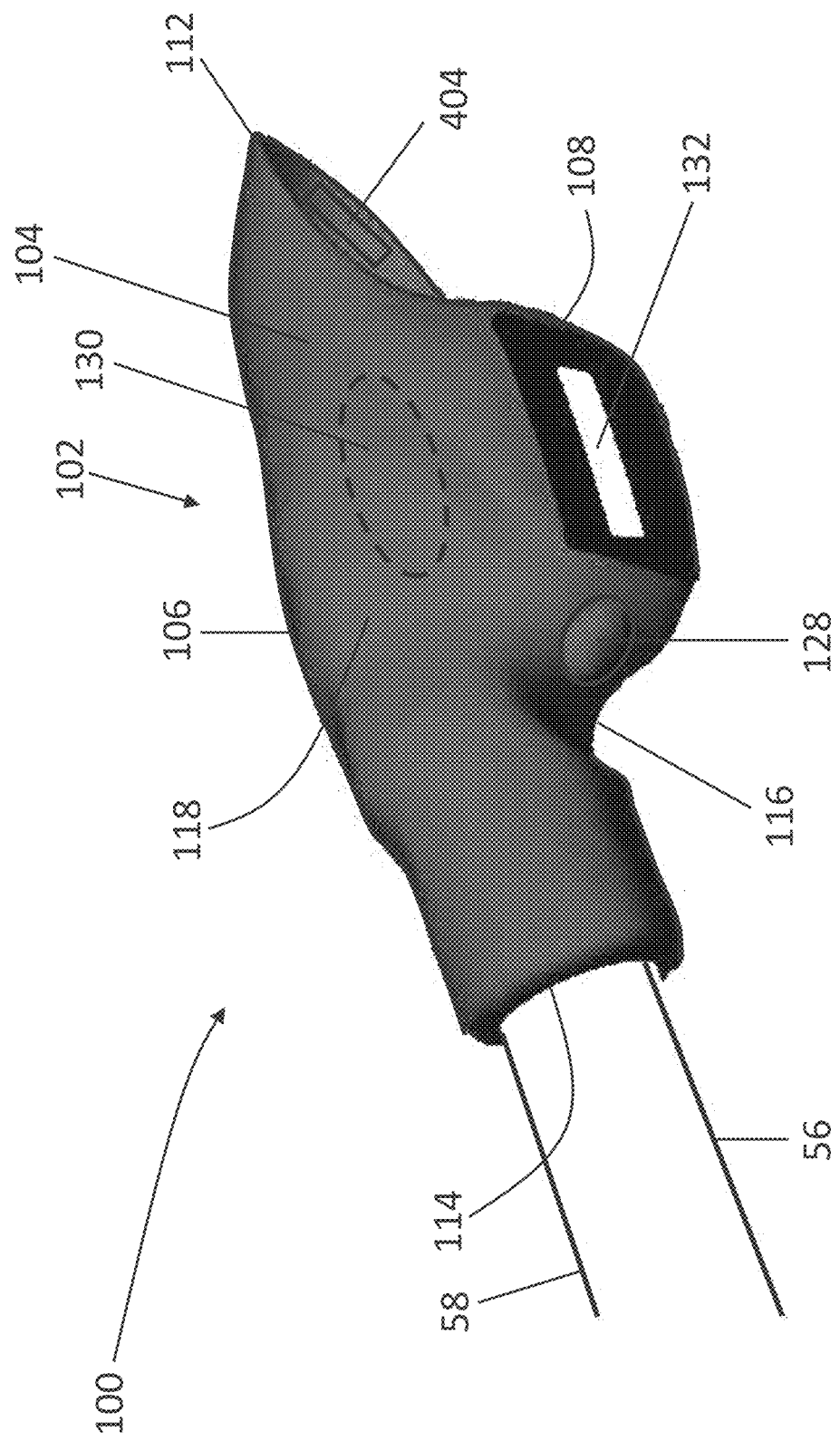
Figure 3:
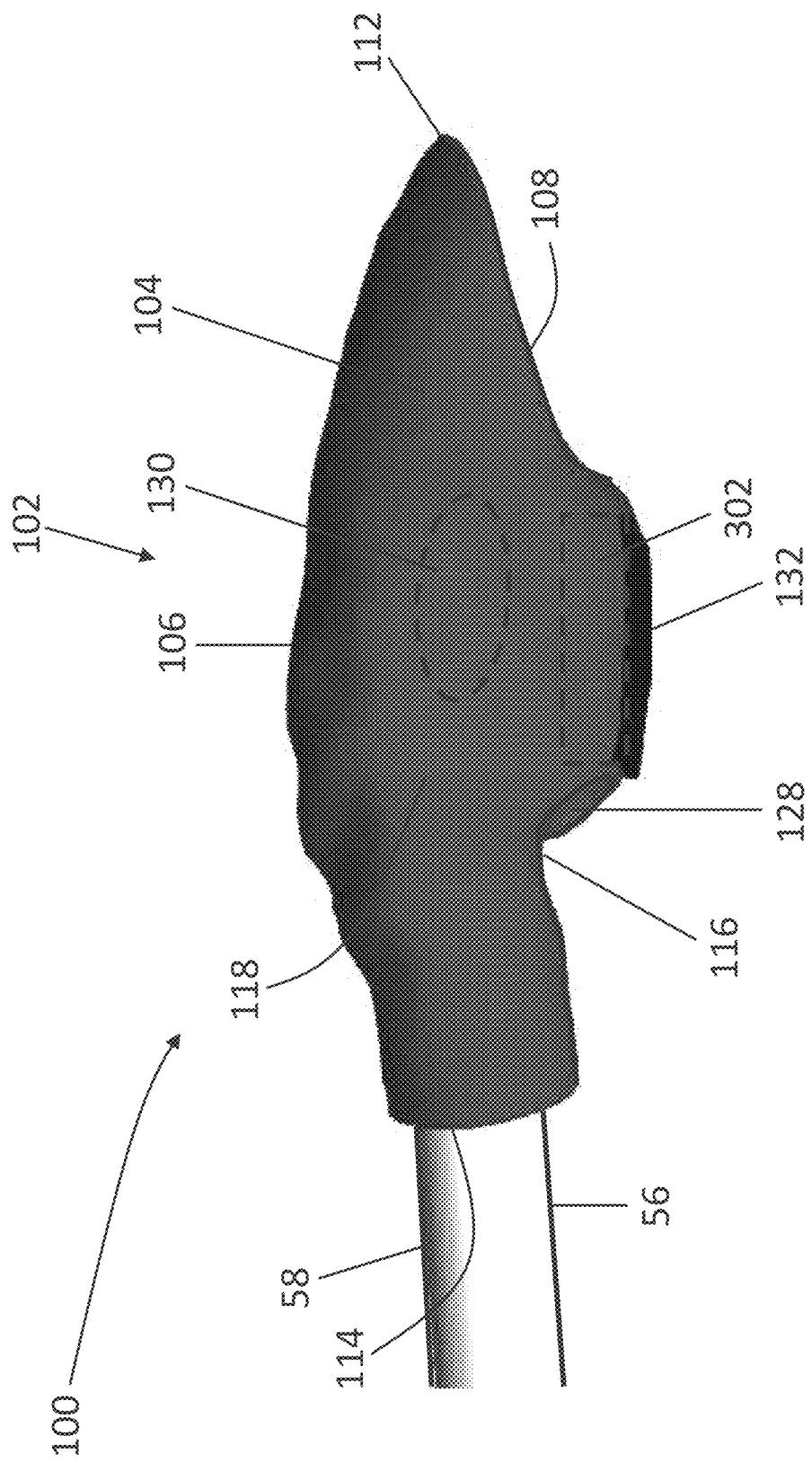

Turning now to FIGS. 2, 3 and 4, for the purposes of this description, the right hand grip assembly 100 that may be configured with the right end 56 of the handlebars 58 will be described with reference to the figures. Note however that the left hand grip assembly 100 that may be configured with the left end 54 of the handlebars 58 may include some or all of the same functionality as described in relation to the right hand grip assembly 100. Note also that the left hand grip assembly 100 may generally be a mirror image of the right hand grip assembly 100, but this may not be required or necessary.

The hand grip assembly 100 may include a handle or hand grip 102 that may generally include a top 104, a front 106, a back 108, a bottom 110, an inner side 114 and an outer side 112. The hand grip 102 may be formed to ergonomically fit the anatomical features and contours of a human hand when the hand is placed on the grip 102. The hand grip 102 may preferably be formed of silicon or other types of rubber, but may also be formed of other materials such as plastics, leather, synthetic leather or other types of materials. Accordingly, hand grip 102 may be molded, sculpted, sewn or otherwise manufactured. Hand grip 102 may also be formed of a combination of types of materials. For example, the core of hand grip 102 may be formed of a plastic or a hard rubber while the outer surface of the hand grip 102 may be formed of a soft silicon layer. Other types and combinations of materials may also be used.

When placed on the hand grip 102, the palm of the user's hand may generally rest on the top 104 of the grip 102 and the fingers of the hand may extend over the front 106 of the grip 102 and onto the bottom 110 of the grip 102. In addition, the thumb of the user's hand may extend downward into the thumb recess 116. Also, the top 104 of the grip 102 may include a rounded portion 118 for the ball of the user's palm to rest upon. In this way, the user's hand may comfortably grip or otherwise hold hand grip 102.

On the bottom 110, hand grip 102 may include one or more finger recesses 120 that may resemble channels or indentations. It may be preferable that hand grip 102 include up to four finger recesses 120-1, 120-2, 120-3 and 120-4 (collectively and individually 120), one for each finger on the human hand. However, other numbers of finger recesses 120 may also be used and the number of finger recesses in no way limits the scope of the control system 10. In the example shown in FIG. 4, the hand grip 102 may be configured with the right end of the handlebars 58 and formed to generally receive and accommodate the right hand of the user. Accordingly, finger recess 120-1, being on the far left, may be formed to receive and accommodate the user's index finger, finger recess 120-2 may be formed to receive and accommodate the user's middle finger, finger recess 120-3 may be formed to receive and accommodate the user's ring finger, and finger recess 120-4 may be formed to receive and accommodate the user's small finger.

The finger indentations 120 may include different depths, for example, the finger indentations 120 may include a depth such that the entire cross sections of the user's fingers may fit within the indentations 120. Alternatively, the finger indentations 120 may have a depth that may allow for only a portion of the cross sections of the user's fingers to fit within the indentations 120. In addition, the finger channels 120 may encompass the user's entire fingers. That is, the finger channels 120 may not be open cavities but instead may resemble tunnels that the user's fingers may slide into. In this case the finger tunnels 120 may completely surround at least a portion of the user's fingers. Note that any combination of the above architectures for the finger channels 120 may also be utilized. For example, the finger channels 120 may have a portion that may be an open cavity or indentation and a portion that may resemble an enclosed tunnel.

The finger recesses 120 may be spaced apart and generally arranged to accommodate the user's fingers as they naturally wrap around the hand grip 102. In this way, the comfort of the user's hand in association with the hand grip 102 may be maximized. In addition, discomfort and potential cramping may be minimized by the ergonomic form fitting design. Also, the channels or indentations of the finger recesses 120 may have a length, width and depth to receive each finger fully and comfortably such that the user's hand feels naturally comfortable and relaxed when placed on the hand grip 102. In this way, the hand grip 102 and the finger recesses 120 provide an ergonomic fitting for the user's hand.

Note that the hand grip 102 may be formed of different sizes and shapes to accommodate hands of different sizes, shapes, etc. Accordingly, the finger recesses 120 may be sized, spaced and otherwise configured to accommodate hands of different sizes and shapes as well. For example, one version of the hand grip 102 may be formed for adults while another version may be formed for children. It should be noted that that size and shape of the hand grips 102 and finger recesses 120 do not limit the scope of the control system 10 and that any size or shape of hand grips 102 with finger recesses 120 may be used.

Hand grip assembly 100 may also include control, level or activator mechanisms generally located in different locations on its outer surface that may be used to activate, initiate or generally control different functionalities of system 10. The specific functionalities and components that the control mechanisms may control will be described in later sections. The control mechanisms may be buttons, switches, levers, dials, knobs, joysticks (e.g. mouse tracking joysticks) or other types of control mechanisms. In one example, the control mechanisms may be control buttons. The control buttons may be raised, flush with the surface of the hand grip 102, indented, recessed or any combination thereof. In one example, the control buttons may be slightly raised buttons that may be located and configured within the finger channels 120. In this configuration, the control buttons may be pressed or otherwise activated by each respective finger that may be placed within each respective finger recess 120. For example, the hand grip assembly 100 may include a control button 122 that may be positioned and configured within the finger recess 120-1. In this way, the control button 122 may be pressed or generally activated by the user's index finger as desired when the user's index finger is placed into the finger recess 120-1.

The control button 122 may preferably be located in a position within the finger recess 120-1 that may allow for the user's index finger to generally rest upon and easily activate the button 122 as desired when the user is comfortably gripping the hand grip 102. Accordingly, it may be preferable for the control button 122 to be generally located in the end of the finger recess 120-1 so that at least a portion of the finger tip of the user's index finger may generally rest upon the control button 122 as the user grips the hand grip 102. In this way, the user may not need or otherwise be required to move his/her index finger within the channel 120-1 to access the control button 122, but may instead simply press down on the control button 122 with his/her fingertip to activate it as necessary. Note also that the control button 122 may also be configured in other positions within finger recess 120-1 so that it may be activated by other portions of the user's index finger. For example, the control button 122 may be configured in a position that it may be activated by the underside of the middle knuckle of the user's index finger. Other configurations and positions of control button 122 may also be used.

In a similar fashion, control button 124 may be configured within finger recess 120-2 in a position to be generally activated by the fingertip of the user's middle finger, and control button 126 may be configured within finger recess 120-3 in a position to be generally activated by the fingertip of the user's ring finger. In addition, while it is not depicted in FIG. 4, an additional control button may be configured within finger recess 120-4 in a position to be generally activated by the fingertip of the user's small finger. Also, as with control button 122 within finger channel 120-1, control buttons 124, 126 may be positioned within finger channels 120-2, 120-3 in other positions to be activated by other portions of the user's fingers.

It should also be noted that more than one control button may be configured within a single finger recess channel 120, for example, a first control button within the finger channel 120 may be positioned to be activated by the user's fingertip while second control button within the same finger channel 120 may be positioned to be activated by the underside of the middle knuckle of the user's same finger. Other configurations and combinations of configurations may also be used.

In addition, a control button 128 may be configured within the thumb recess 116 as shown in FIG. 2 and FIG. 3. It may be preferable that control button 128 be positioned within the thumb recess 116 so that at least a portion of the thumb tip that may be placed within the thumb recess 116 may contact the control button 128 while the user comfortably grips the hand grip 102. In this way, the user may not need or otherwise be required to move his/her thumb within the thumb channel 116 to access the control button 128, but may instead simply press down on the control button 128 with his/her thumb to activate it as necessary. Note also that the control button 128 may also be configured in other positions within the thumb recess 116 so that it may be activated by other portions of the user's thumb. For example, the control button 128 may be configured in a position that it may be activated by the underside of the last knuckle of the user's thumb. Other configurations and positions of control button 122 may also be used.

It may be preferable for the control buttons 122, 124, 126, 128 to require a specific amount of force to be activated such that the buttons are not inadvertently activated. That is, as the user rides the bicycle, he/she may inadvertently squeeze the hand grip 102 from time to time depending on the circumstances, and it may be preferable that this inadvertent squeezing may not activate the buttons if not so desired. Instead, it may be preferable that the buttons 122, 124, 126, 128 are activated only by an intentional pressing down upon them. In addition, it may be preferable that control system 10 have the functionality to allow the user to temporarily disable one or more of the control buttons 122, 124, 126, 128 when desired and then to reactivate the disabled buttons when needed. This may be useful, for example, when the rider is riding the bicycle in an environment that may require him/her to hold the handlebars tight, for instance, on an off-road course or trail. For example, system 10 may be programmed to disable the control buttons 122, 124, 126, 128 when the user hits the thumb control button 128 three times in quick succession. In this example, system 10 may also be programmed to reactivate the control buttons when the user hits the thumb control button 128 three times in quick succession a second time. Other types of methods or protocols may also be used to disable and re-enable the control buttons as desired.

Hand grip assembly 100 may also include a biometric sensor 130 that may be generally configured in the top surface 104 of the hand grip 102. The biometric sensor 130 may comprise a sensor with an outer metal plate that may be configured with the exterior surface of the hand grip 102. It may be preferable for the biometric sensor 130 to be generally located such that the user's palm may rest upon the metal plate of the sensor 130 when the user is gripping the hand grip 102 such that the sensor may take biometric readings of the user's physical condition. In one example, the sensor 130 may take readings of the user's heart rate. Other biometric readings may also be taken by the sensor 130. Note that the biometric sensor 130 may also be located in other positions on hand grip assembly 100. In addition, hand grip assembly 100 may include more than one biometric sensor 130.

As shown in FIG. 2, hand grip assembly 100 may also include display 132 that may comprise a readout, a digital display, a dashboard, a monitor, a touch screen, an LED or OLED display or other type of displays. The display 132 may be generally configured with the back 108 or top 104 of the hand grip 102 so that it may be visible to the rider of the bike 50. It may be preferable that the display 132 be of sufficient size that the information on the display 132 may be discernible by the rider. The display 132 may be embedded into the hand grip 102 or may be attached or otherwise secured to the hand grip 102 with an attachment mechanism such as a housing, a frame, a clamp or other type of structure or attachment mechanism. In any event, the display 132 may be secured to the hand grip 102 in such a way that it is secure even when the bicycle is in motion.

The display 132 may deliver information to the rider such as the speed of the bicycle, the distance traveled, the heartrate of the rider (e.g. the display may receive information from the biometric sensor 130), the calories burned from the riding of the bicycle, the name of the song that the rider may be listening to on a mobile music device, and other types of information and readings. The display 132 may also be configured to communicate or otherwise interact with the user's mobile phone such that the display may notify the user of incoming calls, texts, emails or other types of notifications. This will be described in later sections.

In addition, the hand grip assembly 100 may also include an electronics housing that will be described in later sections.

Power Assembly

Control system 10 may also include a power assembly 200 that may generally supply power to control system 10 and the various devices and components that it may comprise. In addition, the power assembly 200 may also supply power to peripheral devices that the user of control system 10 may wish to control and power through the use of system 10 (e.g. smart phone and mobile music players).

Power assembly 200 may include a wheel hub dynamo 202 as shown in FIG. 1. As is known in the art, a wheel hub dynamo may be a small electric generator that may be configured into the hub of a bicycle wheel that may be used to convert the kinetic energy of the spinning bicycle wheel to power. The hub dynamo may generate an electrical current to power accessories such as headlights and taillights. The hub dynamo 202 may be a true dynamo 202 that may generate direct current (DC) or a magneto that may generate alternating current (AC). If the generator 202 is a magneto, it may require an AC to DC converter (such as a diode bridge) to convert the AC that it may generate to a DC that may be needed to power accessories such as lights, mobile phones and other DC powered devices. Note that other types of power generators may also be used. In one example, the hub dynamo 202 may be regulated to 3 watts at 6 volts or to 6 watts at 12 volts. In another example, a Shimano brand dynamo for Brompton Bikes may be utilized. Other power and voltage outputs, as well as other brands of generators may also be used.

In addition to providing real time power to control system 10, its components and devices, as well as other devices that the user may wish to power, the hub generator 202 may also provide power to rechargeable battery 204. Rechargeable battery 204 may be configured with the bike 50 (e.g. attached to the underside of the top frame bar as shown in FIG. 1 or in other locations) and may be configured to receive a charging voltage from the hub dynamo 202 (via appropriate power cables, wires and other types of electrical lines). In this way, the hub dynamo 202 may charge rechargeable battery 204 such that rechargeable battery 204 may then provide power to system 10, its components and devices, as well as to other devices that the user may wish to power, when there may not be sufficient power generated by the wheel hub dynamo (e.g. when the bicycle is moving slowly or is at rest). The rechargeable battery 204 may be configured to continually draw or otherwise receive power from the hub dynamo 202 in order to recharge, may be configured to periodically receive power from the hub dynamo (e.g. based on time), may be configured to receive power from the hub dynamo 202 based on other criteria such as speed of the spinning wheel configured with the dynamo 202, or in any other power receiving configuration or combinations of configurations.

Electronics Assembly

Electronics assembly 300 may include a wide variety of electronics, circuitry, electrical components and devices, control boards, processors, microprocessors, microcontrollers, memory, power transformers, impedance matching networks and other types of electrical and non-electrical components and devices that may be necessary to generally power, control, maintain and generally operate system 10.

For example, the electronics assembly 300 may include the AC to DC converter (e.g. a diode bridge) that may be used to convert the AC generated by the hub dynamo 202 to a usable DC that may be used to power the components of system 10. In addition, the electronics assembly 300 may include one or more power transformers that may transform the initial output voltage level to the levels that may be required by the different devices that may be powered by the generator 202. For example, headlights and taillights may require a particular voltage to operate while a mobile phone connected to system 10 may require a different voltage. In this case, the electronic assembly 300 may include the necessary power transformers and impedance matching networks that may be required to create the desired voltages and deliver them efficiently to the different devices.

Electronics assembly 300 may also include the processors, microprocessors, microcontrollers, control boards, or other types of controllers that may be necessary to control and operate the components of system 10 such as the display 132, the biomedical sensor 130, a Bluetooth controller (described in later sections), headlights, taillights, turn signals, smartphone interface, mobile music player interface, and other types of devices and components. Note that electronics assembly 300 may also include software programs, drivers and applications that may be used to control the various components and devices that may be included and/or used in conjunction with system 10. Also note that the above list of components and devices that may be used with or in conjunction with system 10 is meant for conceptual and demonstration purposes and does not limit the scope of system 10 or the components or devices that system 10 may include or work in conjunction with. Other components and devices may also be included.

The various sections, segments, blocks or portions of the electronics assembly 300 may be configured in a variety of locations. For example, the AC to DC converter may be enclosed within an electrical housing that may be configured to the fork on the bicycle, with power cables connecting it to the wheel hub dynamo 202 and to the hand grip assemblies 100. In addition, one or both hand grip assemblies 100 may include an electrical housing 302 (depicted in FIG. 3 as dashed lines and in FIG. 5) that may be located within the body of the hand grip assembly 100. The electrical housing 302 may preferable be located behind the display 132, but it may be located in other areas. The electronics within the electrical housing 302 may include any of the electronics that may be utilized by system 10, and preferable may include the electronics necessary to control, maintain and generally operate the display 132, the biometric sensor 130 as well as other devices and components. Bluetooth controllers may also be included in the electronics that may be configured within each electronics housing 302, or these controllers may be located elsewhere in system 10.

Both the left hand grip assembly 100 and the right hand grip assembly 100 may each include an electrical housing 302. Note however, that the electronics enclosed within each respective electrical housing 302 may be the same, may be similar, may be different or may be any combination thereof. In addition, wires, powerlines and such may connect the electrical housing 302 that may be configured within the left hand grip assembly 100 to the electrical housing 302 that may be configured within the right hand grip assembly 100.

It should also be noted that system 10 may include all of the necessary wiring and cabling between all of the electronics, electrical components, devices or other elements in order to provide power to all of the aforementioned, to control all of the aforementioned and to generally maintain and operate all of the aforementioned. In this way, system 10 comprises a fully integrated and fully functioning system and framework of interconnected controllers, devices and components. The wires may run along the outside frame, bars or structure of the bicycle (e.g. may be clipped to the bars), may run through the hollow inner cavities of the frame, bars or structure of the bicycle, or in any combination thereof. In addition, the control commands sent by system 10 to its various devices, as well as to external devices that may be operating in conjunction with system 10 (e.g. a smartphone) may be through wireless communications protocols such as Bluetooth or other communication protocols. These connections may also be provided through wires or cables or any combination thereof.

In one example, the power output from the hub dynamo 202 may be divided, and a first portion of the power may be provided to power a headlamp and/or a tail lamp. A second portion of the power may then be directed to the rechargeable battery 204. Using a diode bridge, a portion of the AC power from the hub dynamo 202 may be converted to a 5V charge that may be required to power a microcontroller, as well as a cellphone (that may be configured with system 10 as described in later sections). The AC to DC converter may include a clip-on attachment that may mount the converter to the fork of the bicycle 50 with a wire that may connect it to the dynamo hub 202. A ribbon cable may then run discretely up the fork to the handlebars and split off to snap into the connection points that power the circuitry housed inside the hand grip assemblies 100. In one handlebar grip 100 (e.g. the right) may be housed a microcontroller, and in the other handlebar grip 100 (e.g. the left), a Bluetooth module may be configured. The two grips 100 may also connect to each other via a ribbon cable that may run along the handlebar between the two assemblies 100. Note that this configuration is meant for demonstration purposes and does not limit the scope of the control system 10 in any way. Other configurations may also be used and are within the scope of the system 10.

Elements and Devices That May Be Controlled

As mentioned in earlier sections, control system 10 may generally control, maintain, command or otherwise operate a number of elements, components and devices 400. For example, system 10 may include left turn signal 402 (FIG. 1) and right turn signal 404 (FIGS. 1 and 2) that may comprise blinking LED modules. The left turn signal 402 may be configured on the outer portion 112 of the left hand grip assembly 100, and the right turn signal 404 may be configured on the outer portion 112 of the right hand grip assembly 100 (as depicted in FIG. 2). In another example, the left and right turn signals 402, 404 may be configured in other areas on bike 50 such as beneath the rear of the seat 52, on the rear fender or in other locations.

The turn signals 402, 404 may include timers that may regulate the flashing frequency of the LEDs, as well as reflector cones configured behind the LEDs to reflect generally collimate or focus the light and to direct it in the desired direction to be most effective. In this example, the control button 128 that may be configured within the thumb recess 116 of each hand grip 102 may be configured to control its respective turn signal 402, 404. The button 128 may be configured with a controller (e.g. a microprocessor, microcontroller, a relay switch or matrix, or other type of controller) within the electronics assembly 300 of system 10 such that when the button 128 is engaged or otherwise activated, the controller may provide power to the LED within the respective turn signal to cause it to flash. It may be preferable that the control button 128 configured with the left hand grip 102 may be configured to control the flashing of the left turn signal 402, and the control button 128 configured with the right hand grip 102 may be configured to control the flashing of the right turn signal 404. However, it should be noted that the left and right turn signals 402, 404 may be controlled via other control buttons configured in other areas of system 10.

In another example, system 10 may include a headlight and a taillight that may be turned on and off using one or more of the control buttons 122, 124, 126, 128, or other types of control mechanisms (such as an on/off switch not shown) that may be configured with system 10.

System 10 may also be configured with additional electronic devices 400, elements or components that may generally operate in conjunction with system 10. System 10 may be generally connected to or paired with the additional devices 400 and may gain access to generally control, maintain or operate the devices 400. In one example, system 10 may be configured with an electronic device such as a smartphone 406 that may be attached and secured to the bicycle 50 through the use of a cradle or mount 408. The mount 408 may be configured with the handlebars 508, preferable in the middle region of the handlebars 58 above neck of the front forks, such that the smartphone 406 may be viewable by the rider of the bike 50 when configured with the mount 408. However, the smartphone 406 may be configured in other locations on the bicycle 50 using other types of attachment mechanisms.

System 10 may preferably be paired with the smartphone 406 using a Bluetooth communications protocol that may be controlled via a Bluetooth controller within the electronics assembly 300 of the control system 10. The system 10 may also be connected to the smartphone 406 with cables or wires. Once paired, the control system 10 may manipulate or otherwise control the smartphone 406 by sending it commands over the Bluetooth (or wired) connection. In addition, the control commands that system 10 may send to the smartphone 406 may be initiated or otherwise controlled via the control mechanisms (e.g. control buttons 122, 124, 126, 128) that may be configured with the hand grip assemblies 100.

For example, the control button 122 that may be configured to be activated by the index fingertip of the user's right hand may be programmed to initiate a Play/Pause command to be sent to the smartphone 406. That is, when the rider presses or otherwise activates the control button 122 preferably with his/her right index fingertip, the activation of the control button 122 may initiate the controller within the electronics assembly 300 to send a Play/Pause command to the smartphone 406. In this way, the rider, while listening to music that may be playing on the smartphone 406, may play the music and/or pause the music by pressing down on control button 122. It should be reiterated that the rider may perform this function without ever having to change his/her grip on hand grip 102 or handlebars 58. In this way, the rider may not be required to remove his/her hand from the hand grip 102 and/or the handlebar 58 to interact with the smartphone 406, thereby not becoming dangerously distracted and not placing himself/herself in jeopardy.

In another example, control button 126 that may be configured to be activated by the middle fingertip of the user's right hand may be programmed to initiate a Skip Ahead command to be sent to the smartphone 406. That is, when the rider presses or otherwise activates the control button 126 preferably with his/her right middle fingertip, the activation of the control button 126 may initiate the controller within the electronics assembly 300 to send a Skip Ahead command to the smartphone 406. In this way, the rider, while listening to music that may be playing on the smartphone 406, may skip to the next song in the playlist by pressing down on control button 126.

In yet another example, control button 128 that may be configured to be activated by the ring fingertip of the user's right hand may be programmed to initiate a Volume Up command to be sent to the smartphone 406. That is, when the rider presses or otherwise activates the control button 128 preferably with his/her right ring fingertip, the activation of the control button 128 may initiate the controller within the electronics assembly 300 to send a Volume Up command to the smartphone 406. In this way, the rider, while listening to music that may be playing on the smartphone 406, may turn the volume of the music up by pressing down on control button 128.

Similarly, the control buttons that may be configured with the left hand grip assembly 100 (not shown) may be associated or otherwise programmed to initiate other commands to be sent to the smartphone 406. For example, the control button configured within a finger channel of the left hand grip configured to receive the index finger of the user's left hand may be programmed to initiate a Move to the Next Playlist command to be sent to the smartphone 406 by the system 10 when the button is activated. In addition, the control button configured within a finger channel of the left hand grip configured to receive the middle finger of the user's left hand may be programmed to initiate a Skip Back command to be sent to the smartphone 406 by system 10. In another example, the control button configured within a finger channel of the left hand grip configured to receive the ring finger of the user's left hand may be programmed to initiate a Volume Down command to be sent to the smartphone 406 by system 10. While not shown in the figures, it can be seen and appreciated that the left hand grip assembly 100 may include control buttons similarly configured within its finger channels as compared to the right hand grip assembly 100 that is depicted.

The control buttons 128 may also be programmed to respond to different types of physical activations such as single presses (i.e. by the user's finger), quick successive presses, extended presses, or other types or combinations of types of physical activations. That is, a control button 128 may be pressed momentarily to activate one function, pressed successively to activate a different function and/or held for an extended time to activate yet a different function. For instance, button 122 may be depressed momentarily to signal for the electronic device to play/pause, and could be held down for 1 full second to enter a Bluetooth pairing mode.

Electronic device 406 may also receive a power charge from system 10 via hub dynamo 202, rechargeable battery 204, or from other elements of system 10 or any combination thereof.

Note that other types of electronic devices 406 may also be used in conjunction with control system 10 and generally controlled and operated in a similar fashion through the use of control system 10. For example, portable music players, portable GPS systems, personal exercise trackers (e.g. Fitbit), and other types of devices may be used. In these cases, it may be preferable that the control buttons may be programmed to initiate commands to be sent to the devices 404 by system 10 that may be appropriate for the type of device that may be controlled. For example, for a GPS device that may be paired and controlled by system 10, it may be preferable for one of the control buttons 122, 124, 126 to be programmed to send a Zoom In command to the GPS device so that it's display may zoom in upon activation of the control button for the rider to better view his/her exact location. System 10 may also include any drivers that may be required to control the devices 406.

In addition, system 10 may include a mechanism or app 500 (depicted as a block within electronic device 406 in FIG. 1) that may be installed on a mobile device such as a smartphone, tablet computer or other type of device. The app 500 may allow the user to interface with the system 10 in order to initiate its setup, initialize the system 10, test the system 10 performance, confirm its configuration, set its parameters, configure its different settings, troubleshoot any problems, register the product and the user information, as well as other functionalities. For example, the app 500 may allow the user to program the functionality of the control buttons as desired for different types of electronic devices 406. In this example, the app 500 may include an admin dialog that may allow the user to program the control buttons to control different functionalities of the electronic device(s) 406 depending on the device functionalities being used at the time. For instance, the above example pertained to listening to music on the smartphone 406 and the control buttons 122, 124, 126 were appropriately programmed to control different functionalities that may pertain to listening to music. However, the rider may also be interested in setting a timer on the smartphone 406 to measure the time spent on a particular bike course, and the functionality necessary to reset and start the timer may be programmed into one or more of the control buttons using the admin of the app 500.

In another example, the app 500 may show the power generated by the wheel hub dynamo 202 over the course of a particular period of time. In another example, the app 500 may assist the user to troubleshoot the system 10 by providing a troubleshooting wizard or guideline. In yet another example, the app 500 may allow the user to disable the control buttons so that they may not be activated, and then to re-enable the buttons when their functionality is again desired. This may be beneficial when the user expects to need to grip the hand grips 102 tightly and does not wish to inadvertently press any of the buttons when doing so (e.g. when riding on an off-road or downhill course). It will be immediately appreciated by one of general skill in the art that the scope of app 500 is not limited by the examples above and that app 500 may perform and provide a wide multitude of functionalities that may pertain to system 10.

It may also be preferable for system 10 to save setup files or configuration tables for each different type of device that the user may wish to use in conjunction with system 10 such that the user may pick from a library of control buttons settings as desired. The files may be saved within the electronics assembly 300 or by the app 500 that may reside on a portable or mobile device. Once the user may choose what device and functionalities he/she may wish to implement, the system 10 may program the functionalities of the control buttons accordingly. It may also be preferable for system 10 to automatically recognize the type of electronic device 404 that it may be paired with and automatically program the control buttons according to the saved setup file for the identified device 404.

Note that while it may be preferable for system 10 to communicate with device 404 via wireless Bluetooth communication protocols, other types of wireless protocols may also be used. In addition, system 10 may be connected to digital device 404 via cables or transmission lines.

It should be appreciated that the descriptions and examples above are meant for demonstration purposes and do not limit the scope of control system 10 in any way, and that control system 10 may include and/or be configured to communicate with and operate in conjunction with other types of elements, components and devices or any combination thereof.

As used herein, including in the claims, the phrase "at least some" means "one or more," and includes the case of only one. Thus, e.g., the phrase "at least some ABCs" means "one or more ABCs," and includes the case of only one ABC.

As used in this description, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A control system, the system comprising:
   a controller configured to control at least one electronic device;
   at least one hand grip adaptable for use on a steering device and including a first portion adapted to engage a user's palm and a second portion located opposite to the first portion and adapted to engage the user's fingers;
   at least one ergonomic recess configured at the second portion; and
   at least one control button configured at the second portion, each of the at least one control button located at a corresponding ergonomic recess, and communicatively coupled to said controller;
   wherein activation of said at least one control button instructs the controller to output control signals that control the at least one electronic device.

2. The system of claim 1 wherein the steering device is chosen from the group of: a handlebar configured with a bicycle, a steering wheel configured with an automobile, a handlebar configured with a motorcycle and a handlebar configured with a scooter.

3. The system of claim 1 wherein the at least one electronic device is at least one selected from the group: a smartphone, a mobile music player, a mobile GPS unit and a turn signal.

4. The system of claim 1 wherein the at least one ergonomic recess is adapted to receive at least a first portion of a first finger of the user's hand.

5. The system of claim 4 wherein the at least one control button is adapted to be activated by at least a portion of the first portion of the first finger of the user's hand.

6. The system of claim 1 wherein the output control signals are at least one chosen from the group: play/pause, volume up, volume down, skip forward, skip back, move to the next playlist, turn on left turn signal and turn on right turn signal.

7. The system of claim 1 wherein the control signals are output using a wireless communication protocol.

8. The system of claim 1 further comprising a display.

9. The system of claim 1 wherein the at least one control button includes a total of three control buttons.

10. A control system, the system comprising:
    a controller configured to control at least one electronic device;
    at least one hand grip adaptable for use on a handlebar and including a first portion adapted to engage a user's palm and a second portion located opposite to the first portion and adapted to engage the user's fingers;
    at least one ergonomic recess configured at the second portion and configured to receive at least one finger of the user's hand; and
    at least one control button configured at the second portion, each of the at least one control button located at a corresponding ergonomic recess, and communicatively coupled to said controller;
    wherein activation of said at least one control button instructs the controller to output control signals that control the at least one electronic device.

11. The system of claim 10 wherein the at least one electronic device is at least one selected from the group: a smartphone, a mobile music player, a mobile GPS unit and a turn signal.

12. The system of claim 10 wherein the at least one control button is activated by the at least one finger of the user's hand.

13. The system of claim 10 wherein the output control signals are at least one chosen from the group: play/pause, volume up, volume down, skip forward, skip back, move to the next playlist, turn on left turn signal and turn on right turn signal.

14. The system of claim 10 wherein the control signals are output using a wireless communication protocol.

15. The system of claim 10 further comprising a display.

16. The system of claim 10 wherein the at least one control button includes a total of three control buttons.

17. A control system, the system comprising:
a controller configured to control at least one electronic device;
at least one hand grip adaptable for use on a handlebar of a bicycle and including a first portion adapted to engage a user's palm and a second portion located opposite to the first portion and adapted to engage the user's fingers;
at least one ergonomic recess configured at the second portion and configured to receive at least one finger of the user's hand; and
at least one control button configured at the second portion, each of the at least one control button located at a corresponding ergonomic recess, and communicatively coupled to said controller;
wherein the at least one control button is activated by the at least one finger of the user's hand; and
wherein activation of said at least one control button instructs the controller to output control signals that control the at least one electronic device.

18. The system of claim 17 wherein the at least one electronic device is at least one selected from the group: a smartphone, a mobile music player, a mobile GPS unit and a turn signal.

19. The system of claim 17 wherein the output control signals are at least one chosen from the group: play/pause, volume up, volume down, skip forward, skip back, move to the next playlist, turn on left turn signal and turn on right turn signal.

20. The system of claim 17 wherein the control signals are output using a wireless communication protocol.

* * * * *